US012734516B1

(12) United States Patent
Hommeltoft et al.

(10) Patent No.: US 12,734,516 B1
(45) Date of Patent: Sep. 15, 2026

(54) INHIBITING CO EMISSIONS DURING CATALYST REGENERATION

(71) Applicant: CHEVRON U.S.A. INC., San Ramon, CA (US)

(72) Inventors: Sven Ivar Hommeltoft, Pleasant Hill, CA (US); Michael Anthony Hutson, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 19/326,542

(22) Filed: Sep. 11, 2025

(51) Int. Cl.
*B01J 38/14* (2006.01)
*B01J 23/92* (2006.01)
*B01J 38/02* (2006.01)

(52) U.S. Cl.
CPC ............... *B01J 38/14* (2013.01); *B01J 23/92* (2013.01); *B01J 38/02* (2013.01)

(58) Field of Classification Search
CPC ... B01J 38/00; B01J 38/14; B01J 23/92; B01J 38/02
USPC ...................... 502/52, 300; 423/245.3, 437.1
See application file for complete search history.

(56) References Cited

U.S. PATENT DOCUMENTS 2,664,336 A 12/1953 Cornell
3,433,733 A 3/1969 Bunn, Jr. et al.
3,784,463 A 1/1974 Reynolds et al.
3,894,936 A 7/1975 Hartley
4,007,131 A * 2/1977 Gillespie ................ C10G 47/12 502/52
4,645,585 A 2/1987 White
4,880,574 A 11/1989 Welsh
5,145,490 A 9/1992 Sadowski
6,187,465 B1 2/2001 Galloway
(Continued)

FOREIGN PATENT DOCUMENTS

CN 101314748 12/2008
CN 102786966 11/2012
(Continued)

OTHER PUBLICATIONS

Chen et al., "Catalytic fast pyrolysis of biomass: Selective deoxygenation to balance the quality and yield of bio-oil," Bioresource Technol., 273, pp. 153-158, 2019.
(Continued)

*Primary Examiner* — Patricia L. Hailey
(74) *Attorney, Agent, or Firm* — Sheppard, Mullin, Richter & Hampton LLP; Jaime D. Choi

(57) ABSTRACT

Some examples herein provide a method of removing deposits from a catalyst. The method may include flowing oxygen-containing gas over a catalyst coated with deposits at oxygen deficient conditions. The method may include, while flowing the oxygen-containing gas at oxygen deficient conditions over the catalyst, heating the catalyst to a first temperature to begin combusting the deposits and generating effluent gas including carbon dioxide and substantially no carbon monoxide. The method may include, while continuing to flow the oxygen-containing gas over the catalyst, gradually increasing a temperature of the catalyst from the first temperature to a second temperature at a rate selected to continue combusting the deposits and generating effluent gas including carbon dioxide and substantially no carbon monoxide.

19 Claims, 6 Drawing Sheets

(56) References Cited

U.S. PATENT DOCUMENTS 7,998,339 B2 8/2011 Myllyoja et al.
8,350,102 B2 1/2013 Roberts, IV et al.
8,354,065 B1 1/2013 Sexton et al.
9,580,657 B2 2/2017 Heydenrych et al.
9,903,584 B2 2/2018 Fan et al.
10,190,059 B2 1/2019 Chapus et al.
10,479,943 B1 11/2019 Liu et al.
10,947,458 B1 3/2021 Tengfei et al.
11,479,725 B2 10/2022 Amblard et al.
11,555,153 B1 1/2023 Hommeltoft
11,912,947 B1 2/2024 Hommeltoft
12,139,673 B2 11/2024 Andersson et al.
12,319,878 B2 6/2025 Hommeltoft
12,319,881 B1 6/2025 Han et al.
12,421,460 B2 9/2025 Hommeltoft
12,434,224 B2 10/2025 Hommeltoft
2007/0161832 A1 7/2007 Myllyoja et al.
2008/0053870 A1 3/2008 Marker
2009/0000185 A1 1/2009 Aulich et al.
2009/0158637 A1 6/2009 McCall et al.
2009/0300970 A1 12/2009 Perego
2010/0043278 A1 2/2010 Brevoord
2010/0163395 A1 7/2010 Henrich
2011/0021857 A1* 1/2011 Cao .......................... C07C 1/20 422/198
2011/0054230 A1 3/2011 Cole et al.
2011/0056869 A1 3/2011 Novak et al.
2011/0196113 A1* 8/2011 Nesterenko ............... C07C 1/26 526/75
2011/0237853 A1 9/2011 Hamamatsu et al.
2012/0137572 A1 6/2012 Bartek et al.
2012/0160741 A1 6/2012 Gong et al.
2012/0203042 A1 8/2012 Huber et al.
2012/0238787 A1 9/2012 Gruber et al.
2012/0244585 A1 9/2012 Kale et al.
2012/0251424 A1 10/2012 Havlik et al.
2012/0258021 A1 10/2012 Badger
2012/0316093 A1 12/2012 Zhan et al.
2013/0006028 A1 1/2013 Chaogang et al.
2013/0025187 A1 1/2013 Kocal et al.
2013/0338409 A1 12/2013 Trewalla et al.
2013/0338418 A1 12/2013 Xu
2014/0012025 A1 1/2014 Sohling et al.
2014/0109464 A1 4/2014 Powell et al.
2014/0123973 A1 5/2014 North
2014/0148609 A1 5/2014 Roussis et al.
2014/0163285 A1 6/2014 Buchanan et al.
2014/0171700 A1 6/2014 Roberts
2015/0051428 A1 2/2015 Dayton
2015/0087861 A1 3/2015 Devaux et al.
2015/0141703 A1 5/2015 Dubois
2015/0259202 A1 9/2015 Dybkj
2017/0183581 A1 6/2017 Ladkat
2018/0170824 A1 6/2018 Sreekumar
2018/0258349 A1 9/2018 Heydenrych
2019/0185759 A1 6/2019 Kanervo et al.
2019/0299195 A1* 10/2019 Nakazawa ............... B01J 35/51
2020/0017772 A1 1/2020 Ramamurthy
2021/0179952 A1 6/2021 Tsuto et al.
2021/0380885 A1 12/2021 Mills
2022/0041938 A1 2/2022 Hommeltoft
2022/0048833 A1* 2/2022 Drobyshev ........... C07C 1/2072
2022/0049172 A1 2/2022 Tiitta et al.
2022/0119328 A1 4/2022 Schroer
2022/0145199 A1 5/2022 Kuo
2022/0403252 A1 12/2022 Vilja et al.
2023/0098592 A1 3/2023 Novak
2023/0234843 A1 7/2023 Hobby
2023/0357106 A1 11/2023 Missalla et al.
2024/0018419 A1 1/2024 Huizenga
2024/0157320 A1 5/2024 Song et al.
2024/0157347 A1 5/2024 Hommeltoft
2024/0218261 A1 7/2024 Hommeltoft
2024/0253028 A1* 8/2024 Zhang ...................... B01J 38/18
2024/0425764 A1 12/2024 Hommeltoft
2025/0027000 A1 1/2025 Hommeltoft
2025/0333656 A1 10/2025 Hommeltoft
2026/0008023 A1 1/2026 Hommeltoft
2026/0015547 A1 1/2026 Hommeltoft

FOREIGN PATENT DOCUMENTS

EP 2141217 B1 3/2015
EP 4372069 A1 5/2024
FI 20205954 A1 3/2022
FI 20225933 A1 4/2024
FR 2991596 A1 12/2013
WO 2008/152199 12/2008
WO 2009/130392 10/2009
WO 2010071677 6/2010
WO 2014/089131 6/2014
WO 2015/148412 10/2015
WO 2022221840 10/2022
WO 2023/066738 4/2023
WO 2023088772 5/2023
WO 2024006239 1/2024

OTHER PUBLICATIONS

Chen et al., "Recent developments in ignocellulosic biomass catalytic fast pyrolysis: Strategies for the optimization of bio-oil quality and yield," Fuel Process Technol., 196, 106180, 2019.
Han et al., Advancing the application of bio-oils by co-processing with petroleum intermediates: A review, Energy Conversion and Management, 2021.
Liang et al., "Catalytic fast pyrolysis of lignocellulosic biomass: Critical role of zeolite catalysts," Renew. Sust. Energ. Rev., 139, 110707, 2021.
Thangadurai et al., "Acidity and basicity of metal oxide based catalysts in catalytic cracking of vegetable oil," Brazilian Journal of Chemical Engineering, 38:1-20, 2021.
Zhang et al., "Superheated steam as carrier gas and the sole heat source to enhance biomass torrefaction," Bioresource Technology, 2021.
Zhou et al., "Catalytic conversion of lignocellulosic biomass to fine chemicals and fuels," Chem. Soc. Rev. 40, pp. 5588-5617, 2011.
Gibon et al., "Palm oil refining," Eur. J. Lipid. Sci. Technol. 109 (2007), 315-335.
Glowka et al., "Sustainable aviation fuel—Comprehensive study on highly selective isomerization route towards HEFA based bioadditives," Renewable Energy 220 (2024), 9 pages.
Huber et al., "Synthesis of Transportation Fuels from Biomass: Chemistry, Catalysts, and Engineering," Chem. Rev. (2006), 106, 4044-4098.
Mu et al., "Optimum design of radial flow moving-bed reactors based on a mathematical hydrodynamic model," Chemical Engineering and Processing 42 (2003), pp. 409-417.
Renz, "Ketonization of Carboxylic Acids by Decarbooxylation: Mechanism and Scope," Eur. J. Org. Chem. 2005, 979-988.
Shirzad et al., "Moving Bed Reactors: Challenges and Progress of Experimental and Theoretical Studies in a Century of Research," Ind. Eng. Chem. Res. 58 (2019), pp. 9179-9198.
Zabeti et al., "Biodiesel production using alumina-supported calcium-oxide: An optimization study," Fuel Processing Technology 91 (2010) 243-248.
Li et al., "Applications of calcium oxide-based catalyst in biomass pyrolysis/gasification—A review," Journal of Cleaner Production, 291, pp. 1-12, 2021.
Mansir et al., "Catalytically active metal oxides studies for the conversion technology of carboxylic acids and bioresource based fatty acids to ketones: A review," Bioresource Technology Reports 17 (2022) 100988.

* cited by examiner

INHIBITING CO EMISSIONS DURING CATALYST REGENERATION

FIELD

This application generally relates to regenerating a catalyst used in renewable fuel production.

BACKGROUND

There is an increasing interest in using renewable feedstocks, such as derived from plants, algae, animals, microbiological organisms, or other types of biomass, to generate renewable fuels to replace or supplement fossil fuels. However, to increase efficiency but also safety, such conversion may require periodic catalyst regeneration and several conventional steps to prevent the release of carbon monoxide that is formed during such catalyst regeneration, which may increase the time and expense of the conversion.

SUMMARY

Methods and systems for inhibiting carbon monoxide emissions during catalyst regeneration are provided herein.

Some examples herein provide a method of removing deposits from a catalyst. The method may include flowing, over a catalyst coated with deposits, oxygen-containing gas at oxygen deficient conditions. The method may include, while flowing the oxygen-containing gas at oxygen deficient conditions over the catalyst, heating the catalyst to a first temperature to begin combusting the deposits and generating effluent gas including carbon dioxide and substantially no carbon monoxide. The method may include, while continuing to flow the oxygen-containing gas over the catalyst, gradually increasing a temperature of the catalyst from the first temperature to a second temperature at a rate selected to continue combusting the deposits and generating effluent gas including carbon dioxide and substantially no carbon monoxide.

In some examples, the catalyst includes a metal oxide on an oxide support.

In some examples, the first temperature is approximately an ignition temperature of the deposits.

In some examples, the deposits include at least one organic deposit and coke; and the first temperature is selected based on an ignition temperature of the at least one organic deposit, the ignition temperature of the at least one organic deposit being lower than an ignition temperature of the coke.

In some examples, the first temperature is less than or equal to about 600° F.

In some examples, the first temperature is about 450-650° F.

In some examples, the second temperature is about 800-1500° F.

In some examples, a temperature profile between the first temperature and the second temperature monotonically increases.

In some examples, a temperature profile between the first temperature and the second temperature is continuous.

In some examples, a temperature profile between the first temperature and the second temperature is stepped.

In some examples, the rate is about 10-100° F./hr.

In some examples, the deposits include organic byproducts of converting a renewable feedstock to an intermediate composition.

In some examples, the renewable feedstock includes a lipid feedstock, the lipid feedstock including fatty acid glycerol esters. In some examples, the method further includes using the catalyst to convert the renewable feedstock to the intermediate composition before heating the catalyst to the first temperature to begin combusting the deposits. In some examples, the organic byproducts include reaction intermediates from converting the renewable feedstock to the intermediate composition. In some examples, the reaction intermediates include oxygenates. In some examples, converting the renewable feedstock to the intermediate composition and heating the catalyst to the first temperature to begin combusting the deposits are performed in the same reaction vessel. In some examples, the reaction vessel is a fixed-bed reactor.

In some examples, the oxygen-containing gas includes about 0.1-5 vol % oxygen in an inert gas.

In some examples, the oxygen-containing gas includes about 0.5-3 vol % oxygen in an inert gas.

In some examples, an oxygen content of the oxygen-containing gas is changed while combusting the deposits.

In some examples, an oxygen content of the oxygen-containing gas is increased while combusting the deposits. In some examples, the oxygen content of the oxygen-containing gas is about 0.1-1 vol % at a beginning of combusting the deposits. In some examples, the oxygen content of the oxygen-containing gas is increased to about 2-5 vol % after the beginning of combusting the deposits.

In some examples, carbon monoxide forms less than about 2 mol % of the total COx formed while combusting the deposits.

In some examples, carbon monoxide forms less than about 0.1 mol % of the total COx formed while combusting the deposits.

Some examples herein provide a system for removing deposits from a catalyst. The system may include a reaction vessel containing a catalyst coated with deposits. The system may include an inlet to flow an oxygen-containing gas over the catalyst in the reaction vessel. The system may include one or more processors. The system may include memory storing machine-readable instructions that, when executed by the one or more processors, cause the system to perform operations. The operations may include, while the oxygen-containing gas flows over the catalyst, heating the catalyst to a first temperature to begin combusting the deposits and generating effluent gas including carbon dioxide and substantially no carbon monoxide. The operations may include, while the oxygen-containing gas continues to flow over the catalyst, gradually increasing a temperature of the catalyst from the first temperature to a second temperature at a rate selected to continue combusting the deposits and generating effluent gas including carbon dioxide and substantially no carbon monoxide.

In some examples, the system may include a heater configured to heat the catalyst to the first temperature. In some examples, the heater is further configured to heat the catalyst to the second temperature. In some examples, gradually increasing the temperature of the catalyst from the first temperature to the second temperature at the rate includes adjusting an oxygen content of the oxygen-containing gas.

DETAILED DESCRIPTION

Figure 1A:
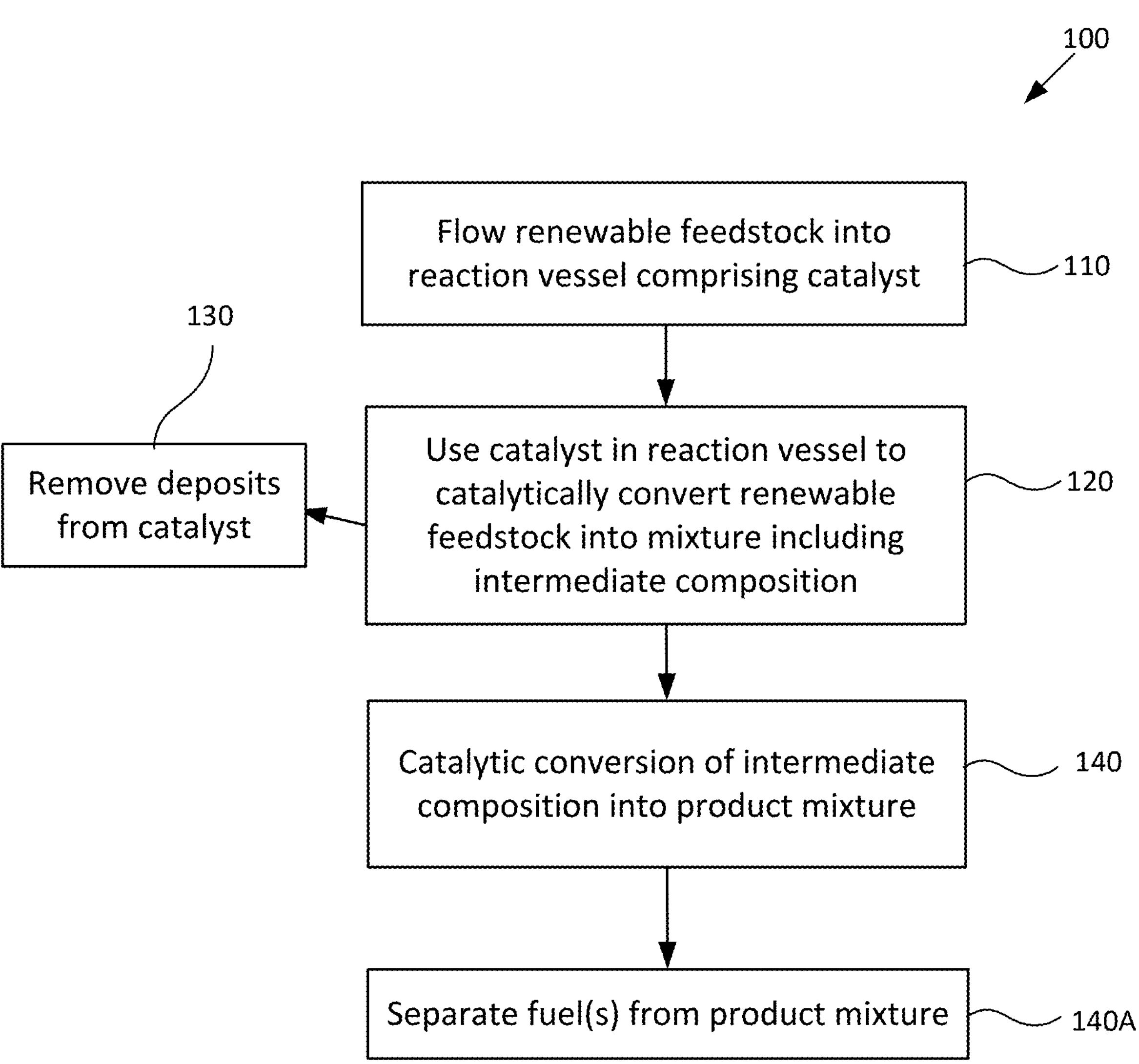
FIG. 1A illustrates an example flow of operations in a method for converting a renewable feedstock to a renewable fuel.

A variety of renewable feedstocks may be used to generate renewable fuels, such as sustainable aviation fuel (SAF) and renewable diesel. During such conversion, a catalyst may be utilized to reduce energy input (e.g., by lowering the activation energy required for the conversion) and to increase the efficiency of the conversion (e.g., by improving the selectivity of reactions), for example. Deposits, such as coke or other organic deposits, may form on the catalyst during the conversion (commonly referred to as "fouling"), causing deactivation of the catalyst and thus requiring replacement or regeneration of the catalyst. However, replacing the catalyst may be costly, and traditional methods of regenerating a catalyst may form an effluent gas containing carbon monoxide-a toxic substance that generally requires additional equipment and processes to prevent its release into the atmosphere.

These and other limitations of conventional, previously known methods of catalyst regeneration may greatly limit throughput and increase cost and complexity of the catalytic conversion, thus discouraging commercial implementation of renewable fuels. Additionally, these and other limitations of previously known methods of catalyst regeneration may increase use of resources, such as energy, thus reducing any carbon savings from renewable fuels.

As provided herein, the present inventors have developed methods and systems for regenerating a catalyst that substantially inhibits the formation of carbon monoxide. More specifically, the present inventors have discovered that gradually increasing a temperature of a catalyst coated with deposits (e.g., coke and/or other deposits), while flowing an oxygen-containing gas over the catalyst, may remove the deposits by combusting the deposits while substantially inhibiting the formation of carbon monoxide. For example, the temperature of the catalyst may be gradually increased from a first temperature, which may be selected to begin combusting the deposits and generating effluent gas containing substantially no carbon monoxide, to a second temperature at a rate selected to continue combusting the deposits and generating effluent gas containing substantially no carbon monoxide.

First, some example terms will be explained. Then, non-limiting examples of the present methods and systems will be described.

Example Terms

As used herein, the term "about" is intended to mean within 10% of the stated value.

As used herein, the term "primarily" is intended to mean a majority, e.g., at least half. Illustratively, a composition which primarily has components with boiling point above a certain level, means that at least half of the composition is made up of components with boiling point about that level. The term "primarily" encompasses all ranges from at least a half to 100%, e.g., 51% or more, about 60% or more, about 70% or more, about 80% or more, about 90% or more, or about 95% or more, or about 98% of more, or about 99% or more, or about 100%.

As used herein, the term "substantially" is intended to mean significantly. Illustratively, a concentration of a component within a first composition which is substantially less than the concentration of that component within a second composition, means that the concentration of that component within the first composition is less than about 20% of the concentration within the second composition, e.g., less than about 10%, less than about 5%, less than 1%, or even less. As another example, a reaction that is performed using substantially only certain components means that of all the components which are present at the reaction, at least about 80%, at least about 90%, at least about 95%, at least about 98%, at least about 99%, or about 100% are the certain components. As yet another example, a reaction that forms an effluent gas that includes carbon dioxide and substantially no carbon monoxide means that the carbon monoxide forms less than about 5 mol % of the total COx formed during the reaction, e.g., less than about 2 mol %, less than about 1 mol %, or less than about 0.5 mol %.

As used herein, the term "lipid" is intended to refer to a fatty acid; glyceride (e.g., monoglyceride or diglyceride); glycerolipid (e.g., triglyceride, also referred to as triacylglycerol, TAG, or neutral fat); phospholipid; or phosphoglyceride (also known as glycerophospholipid).

As used herein, the term "fatty acid" is intended to refer to a monocarboxylic acid having an aliphatic chain containing about 3 to 39 carbon atoms, illustratively about 7 to 23 carbon atoms. The aliphatic chain may be linear or branched, and may be saturated (e.g., may contain no carbon-carbon double bonds) or may be unsaturated (e.g., may contain one or more carbon-carbon double bonds).

As used herein, a "lipid feedstock" is intended to refer to a composition which is derived from a biological source, rather than from a fossil fuel source such as crude oil, shale oil, or coal, and primarily contains lipids. For example, a lipid feedstock may contain more than 50 wt % lipids, may contain more than 70 wt % lipids, may contain more than 85 wt % lipids, may contain more than 90 wt % lipids, may contain more than 95 wt % lipids, or more. A lipid feedstock may be derived from a plant, algae, animal, or microbiological organism. In some examples, a lipid feedstock may be derived from a low value waste material, side stream, by-product, residue, or sewage sludge. A lipid feedstock may be pretreated in a manner such as known in the art, for example, may be degummed, neutralized, bleached, and/or deodorized.

Depending on the source and the pretreatment (if any), a lipid feedstock may contain a mixture of different lipids. Illustratively, a lipid feedstock may include about 0-90 weight percent (wt %) of free fatty acids, about 5-100 wt % of fatty acid glycerol esters (e.g., monoglycerides, diglycerides, and/or triglycerides), and about 0-20 wt % of one or more compounds selected from the group consisting of: fatty acid esters of the non-glycerol type, fatty amides, and fatty alcohols. In some examples, the lipid feedstock may include more than about 50 wt % of free fatty acids and fatty acid glycerol esters, e.g., more than about 70 wt % of free fatty acids and fatty acid glycerol esters, or more than about 80 wt % of free fatty acids and fatty acid glycerol esters. The concentration of free fatty acids in a lipid feedstock may be characterized by determining the total acid number (TAN) of the feedstock, by measuring the mass of potassium hydroxide (KOH) in milligrams that is required to neutralize one gram of the lipid feedstock; see also ASTM D664. In some examples, a lipid feedstock may have a TAN of at least about 5 mg KOH/g, e.g., about 5-150 mg KOH/g, or about 10-150 mg KOH/g, or about 10-100 mg KOH/g, or about 10-50 mg KOH/g, or about 10-25 mg KOH/g, or about 10-20 mg KOH/g. A lipid feedstock may contain one or more impurities, such as phosphorous, silicon, chloride, an alkali metal such as sodium or potassium, an alkaline earth metal such as magnesium or calcium, a metal such as manganese or iron, or the like.

As used herein, the term "intermediate composition" is intended to refer to a liquid product that is produced from a lipid feedstock using a catalytic process, and that may be used directly as a renewable fuel or may be further processed (e.g., subjected to a further conversion step and/or blended into another composition) to generate an at least partially renewable fuel. The intermediate composition may, for example, be subject to further processing such as hydroprocessing, and/or may be further separated/fractionated via distillation, and after such processing (if used) may be used directly as a fuel or may be blended into another composition, such as a fuel. In some examples, the intermediate compositions provided herein may include less than about 70 wt % of an amount of oxygen in the lipid feedstock. An intermediate composition may include oxygenated hydrocarbons such as carboxylic acids, alcohols, ketones, aldehydes, and the like. In some examples, about 10 wt % to 50 wt % of the molecules of a liquid portion of the intermediate composition includes oxygen, and about 50 wt % or more of the molecules of the liquid portion of the intermediate composition do not include oxygen. In some examples, at least about 70 wt %, or at least about 80 wt %, of the oxygen in the liquid portion of the intermediate composition is within ketone groups.

As used herein, the term "pyrolysis" is intended to refer to the thermal decomposition of organic materials in an oxygen-free atmosphere.

As used herein, the term "hydroprocessing" is intended to refer to a process in which a composition is reacted with hydrogen in the presence of a catalyst under suitable conditions, e.g., elevated temperature and/or elevated pressure. Nonlimiting examples of hydroprocessing include hydrogenation, double bond saturation, hydrodeoxygenation, hydrocracking, hydro-isomerization, hydrodesulfurization, hydrodenitrogenation, hydrodearomatization, hydrodewaxing, and mild hydrocracking.

As used herein, the term "transportation fuel" refers to a fraction, cut, or blend of hydrocarbons having a distillation curve which is standardized for use in the transportation industry. For example, diesel fuel corresponds to a middle distillate from 160° C. to 380° C. (according to EN 590). As another example, aviation turbine fuel (also referred to as "jet fuel") corresponds to a distillate from 160° C. to 300° C. (according to ASTM D1655). A "jet fuel blend" refers to jet fuel that is produced by blending two distinct components together, e.g., by blending a synthetic blending component, such as provided herein, together with either a conventional blending component or with a second synthetic blending component. Gasoline and naphtha are other standardized, well-characterized forms of transportation fuels. When a transportation fuel is derived from a lipid feedstock (e.g., via an intermediate composition in a manner such as provided herein), then the transportation fuel may be referred to herein as a "renewable fuel." When a fuel (such as a transportation fuel, e.g., renewable fuel) is ready for use without substantial further processing, it may be referred to herein as a "final product." The final product may be conveyed to a site of use in any suitable manner, e.g., by pipeline, truck, and/or rail.

As used herein, the term "ppm" is intended to refer to parts-per-million and is a weight-relative parameter. A ppm is a microgram per gram, such that a component that is present at 10 ppm in a composition is present at 10 micrograms of the component per 1 gram of the composition.

Regenerating Catalysts Used in Converting Renewable Feedstocks to Fuel

As noted further above, conventional, previously known methods of regenerating catalysts may cause undesirable byproducts to form, such as carbon monoxide. The present inventors have discovered that the present systems and methods may be used to efficiently and cost-effectively regenerate a catalyst substantially without causing the formation of carbon monoxide. Although the present systems and methods for regenerating a catalyst may be described with reference to a catalyst that is used in the conversion of a lipid feedstock to fuel, it will be understood that the present systems and methods for regenerating a catalyst may also be applicable to a catalyst that is used in the conversion of a non-lipid feedstock to fuel. Non-lipid feedstocks may include, but are not limited to, certain types of biomass, such as organic waste, or other renewable feedstocks.

FIG. 1A illustrates an example flow of operations in a method for converting a renewable feedstock to a fuel and/or a fuel blend. Method 100 illustrated in FIG. 1A may include flowing the renewable feedstock into a reaction vessel including a catalyst (operation 110). In some examples, the renewable feedstock may be a lipid feedstock including fatty acid glycerol esters. Nonlimiting examples of renewable feedstocks are provided further above. The renewable feedstock may be flowed over any suitable catalyst. For example, the catalyst may be a metal oxide catalyst on an oxide support. In some examples, the catalyst includes at least one metal selected from the group consisting of Na, K, Mg, Ca, Sr, and a rare earth metal. Illustratively, the catalyst may include at least one metal selected from the group consisting of Na, K, Ca, and Mg. In some examples, the catalyst may include an alkali metal such as lithium, sodium, or potassium. In some examples, the catalyst may include an alkaline earth metal such as magnesium, strontium, or calcium.

In one nonlimiting example, the catalyst may include calcium oxide, and in some examples may consist essentially of calcium oxide, or may consist of calcium oxide. The calcium within the calcium oxide catalyst may be in oxidation state 2 (as in CaO), but it may be in any suitable chemical form and is not limited to exclusively CaO. Additionally, the chemistry of the calcium oxide catalyst may change over time and/or with exposure to the renewable feedstock. For example, the calcium oxide catalyst initially may be in the form of CaO, CaO(OH), or $Ca(OH)_2$, or a mixture thereof. In operation, the calcium may be in the form of a mixture of any such compounds and/or in the form of carbonate or carboxylate. Additionally, or alternatively, the calcium may become partially embedded in the oxide support as aluminate, for example, oxy-aluminate and/or hydroxy-aluminates.

The catalyst may be supported on any suitable oxide support, such as alumina. In some examples, the renewable feedstock is flowed over substantially no other solid-state materials besides the catalyst (e.g., calcium oxide catalyst or other alkaline earth metal oxide catalyst) on the oxide support (e.g., alumina).

The renewable feedstock may be flowed over the catalyst in any suitable reaction vessel(s) (e.g., a reactor). Although the oxide support may not specifically be mentioned in all cases, it will be understood that, in certain examples, the catalyst is supported by a oxide support. In some examples, the catalyst is in a fixed bed over which the renewable feedstock is flowed, the catalyst and the renewable feedstock may be brought into contact with one another in any suitable manner. In other examples, the catalyst instead may be in a fluid bed, or in a moving bed. It will be appreciated that the catalyst may have any suitable configuration for use in the particular reaction vessel. In some examples, the catalyst includes particles with sizes in the range of about 0.01 mm to about 5 mm. In nonlimiting examples in which a fixed bed reaction vessel is used, the catalyst may include (or in some cases may consist essentially of) particles with sizes in the range of about 1 mm to about 5 mm. In nonlimiting examples in which a fluid bed reaction vessel is used, the catalyst may include (or in some cases may consist essentially of) particles with sizes in the range of about 0.05 mm to about 0.2 mm. In nonlimiting examples in which a moving bed reaction vessel is used, the catalyst may include (or in some cases may consist essentially of) particles with sizes in the range of about 0.05 mm to about 0.2 mm.

The catalyst additionally, or alternatively, may have any suitable combination of properties, e.g., bulk density, particle density, packed density, pore volume, large pore content, average pore diameter, and/or surface area. Illustratively, the catalyst may have one or more of the following properties, or any suitable combination of two or more of the following properties: a bulk density in the range of about 0.78 kg/l to about 0.86 kg/l; a particle density in the range of about 1.2 kg/l to about 1.4 kg/l; a packed density in the range of about 0.8 g/cc to about 1.0 g/cc; a pore volume in the range of about 0.42 to about 0.48 cc/g; a large pore content (pores >1000 Å) of about 0.30 cc/g to about 0.38 cc/g; an average pore diameter (D50) of about 100 Å to about 200 Å; and/or a surface area of about 50 $m^2/g$ to about 150 $m^2/g$. Additionally, or alternatively, the catalyst may have one or more of the following properties, or any suitable combination of two or more of the following properties: a bulk density in the range of about 0.80 kg/l to about 0.84 kg/l; a particle density in the range of about 1.1 kg/l to about 1.3 kg/l; a packed density in the range of about 0.85 g/cc to about 0.95 g/cc; a pore volume in the range of about 0.44 to about 0.46 cc/g; a large pore content (pores >1000 Å) of about 0.33 cc/g to about 0.36 cc/g; an average pore diameter (D50) of about 130 Å to about 160 Å; and/or a surface area of about 80 $m^2/g$ to about 120 $m^2/g$.

Referring again to FIG. 1A, method 100 may include using the catalyst in the reaction vessel to catalytically convert the renewable feedstock into a mixture which includes an intermediate composition (operation 120). The renewable feedstock may be reacted with the catalyst under any suitable combination of reaction conditions to generate the mixture. In various examples, the catalytic conversion may be performed at a temperature of about 400° C. to about 700° C., illustratively about 425° C. to about 600° C., e.g., about 450° C. to about 550° C., e.g., about 475° C. to about 500° C. Additionally, in some examples, the catalytic conversion may be performed at a pressure in the range of about 0.01 MPa to about 10 MPa, illustratively about 0.1 to about 5 MPa, e.g., about 0.1 to about 1 MPa. Additionally, in some examples, the catalytic conversion may be performed at a liquid hourly space velocity (LHSV) in the range of about 0.1 $h^{-1}$ to about 10 $h^{-1}$, illustratively about 0.2 $h^{-1}$ to about 5 $h^{-1}$, or about 0.3 $h^{-1}$ to about 3 $h^{-1}$, or about 0.5 $h^{-1}$ to about 1.5 $h^{-1}$. LHSV may be calculated as the volume of renewable feedstock per volume of catalyst per hour.

In some examples, the catalytic conversion of the renewable feedstock to the mixture uses steam as an additional input to the reaction vessel. The steam may inhibit cracking and coke formation, for example. In some examples, the steam is provided in an amount of about 0 wt % to about 50 wt %, and its use is optional. Some examples use substantially only steam and the renewable feedstock as inputs to the reaction vessel for reactions which are catalyzed by the catalyst. That is, hydrogen may not be separately input to the reaction vessel. Additionally, the steam may not be a reactant in the reactions between the renewable feedstock and the catalyst, e.g., may not be a source of hydrogen for such reactions. In some examples, the steam is omitted.

The reaction(s) performed using the catalyst may reduce the amount of oxygen in the renewable feedstock. For example, the intermediate composition may include less than about 70 wt % of an amount of oxygen in the renewable feedstock. Additionally, the reaction(s) performed using the catalyst may modify the location(s) of oxygen within the molecules being reacted. For example, at least about 70 wt %, or at least about 80 wt %, of the oxygen in the liquid portion of the mixture may be within ketone groups. In comparison, in some examples, the renewable feedstock substantially may not include any ketone groups.

In some examples, in addition to converting the renewable feedstock to the mixture, the catalyst also may be used to remove impurities from the renewable feedstock during operation 120, for example without the use of a separate catalyst. Indeed, the catalytic conversion described above with reference to FIGS. 1A and 2A may remove multiple contaminants. Referring again to FIG. 1A, method 100 may include removing the deposits from the catalyst, which may also be referred to as regenerating the catalyst (operation 130). As alluded to above, converting the renewable feedstock into the mixture may form deposits on the catalyst. The deposits may be coke and/or other organic deposits, for example. The deposits may be reaction intermediates from converting the renewable feedstock to the mixture including the intermediate composition. In some examples, the reaction intermediates may include oxygenates. The deposits may foul the catalyst causing deactivation of the catalyst. Accordingly, to maintain the activity of the catalyst, it is desirable to periodically remove the deposits from the catalyst.

Figure 1B:
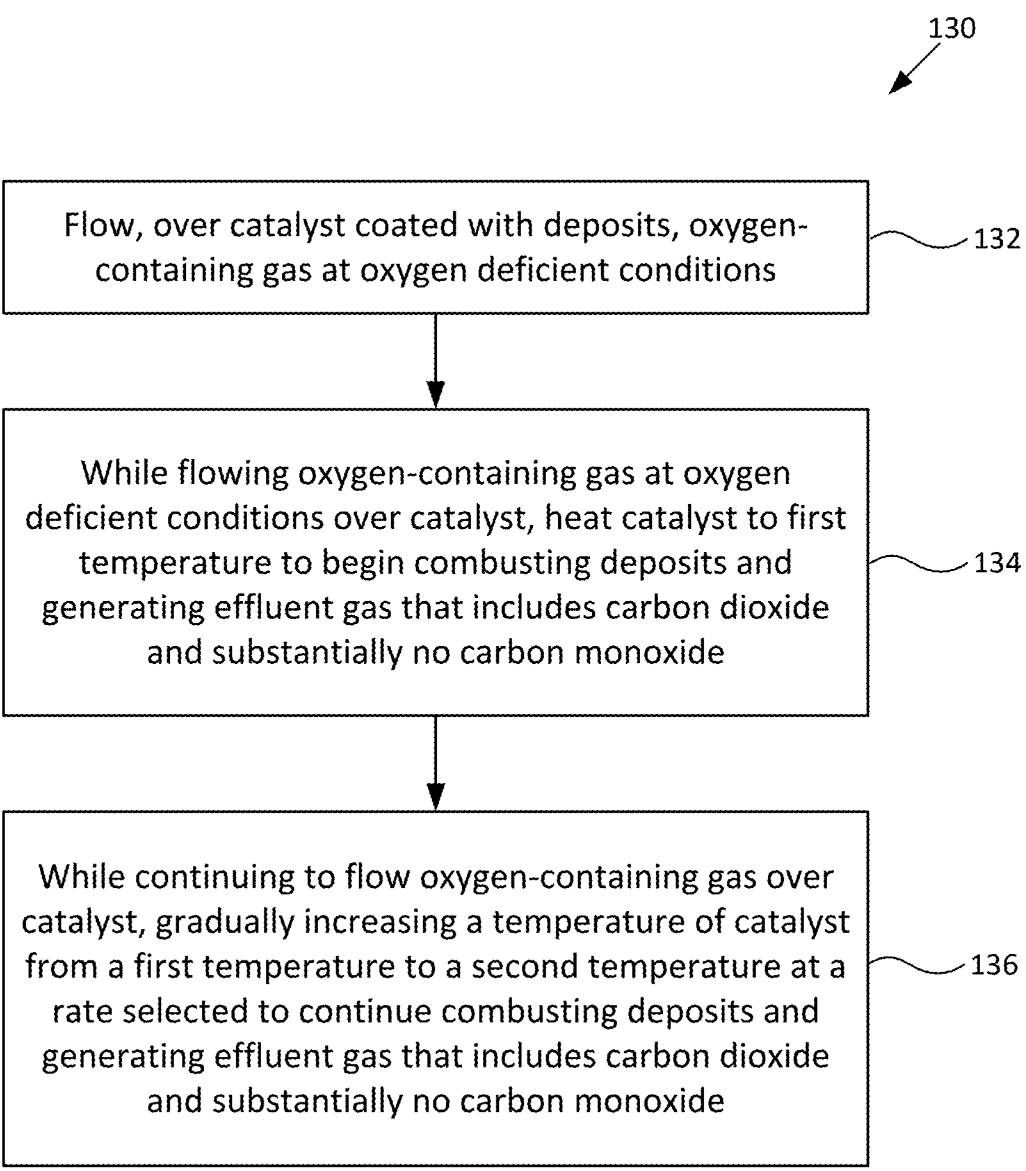
FIG. 1B illustrates an example flow of operations in a method for removing deposits from a catalyst.

FIG. 1B illustrates an example flow of operations in a method for removing deposits from a catalyst. Operation 130 of FIG. 1A may include implementing the method illustrated in FIG. 1B. For example as illustrated in FIG. 1B, operation 130 may include flowing, over the catalyst coated with the deposits, oxygen-containing gas at oxygen deficient conditions (sub-operation 132). The oxygen-containing gas may be an additional input to the reaction vessel via an inlet of the reaction vessel. As used herein, "oxygen deficient conditions" means conditions where there is a molar excess of fuel (i.e., organic deposits and coke) such that more fuel is present (e.g., on the catalyst within the reaction vessel) than is required to completely react with the available oxygen based on the stoichiometry of the reaction. In some examples, the oxygen-containing gas may include about 0.1-5 vol % oxygen in an inert gas, e.g., about 0.5-3 vol % oxygen in the inert gas, e.g., about 1-2.5 vol % oxygen in the inert gas, or about 1.5-2.5 vol % oxygen in the inert gas. In a nonlimiting example, the inert gas may be hydrogen.

Referring again to FIG. 1B, operation 130 may include, while flowing the oxygen-containing gas at oxygen deficient conditions over the catalyst, heating the catalyst to a first temperature to begin combusting the deposits and generating an effluent gas that includes carbon dioxide and substantially no carbon monoxide (sub-operation 134). In some examples, the first temperature may be approximately an ignition temperature of the deposits. Accordingly, heating the catalyst to the first temperature may begin combusting the oxygen in the oxygen-containing gas with the deposits on the catalyst, thereby beginning the removal of (that is, combustion of) the deposits. The effluent gas may result from the combustion of the deposits. In nonlimiting configurations in which the deposits include an organic deposit and coke, the first temperature may be selected based on an ignition temperature of the organic deposit, with the organic deposit having an ignition temperature that is lower than an ignition temperature of the coke. In some examples, the first temperature may be less than or equal to about 600° F. In other examples, the first temperature may be in the range of about 450° F. to about 650° F.

Figure 4:
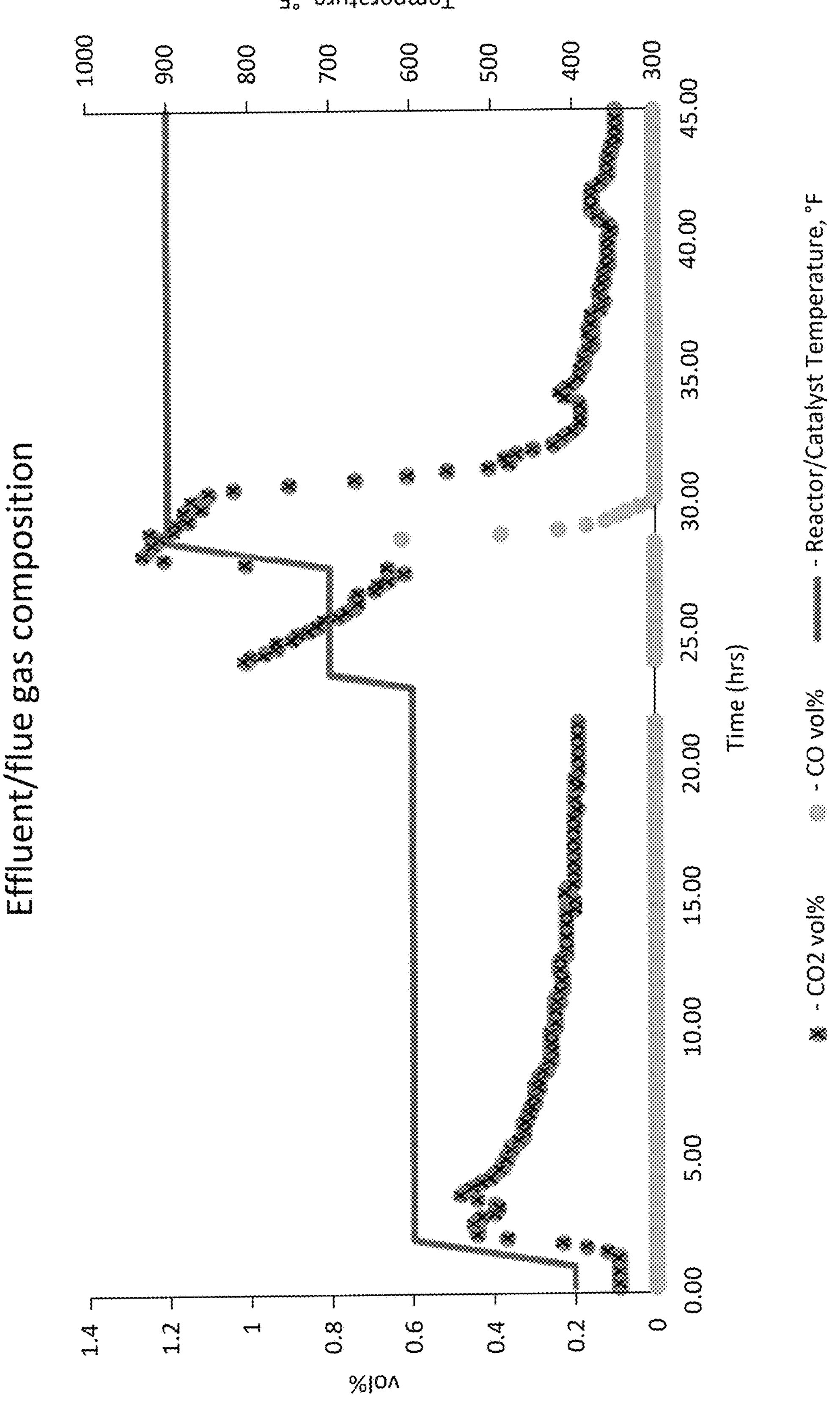
FIGS. 4 and 5 are plots illustrating the composition of effluent gas over time that is formed during catalyst regeneration.
Figure 5:
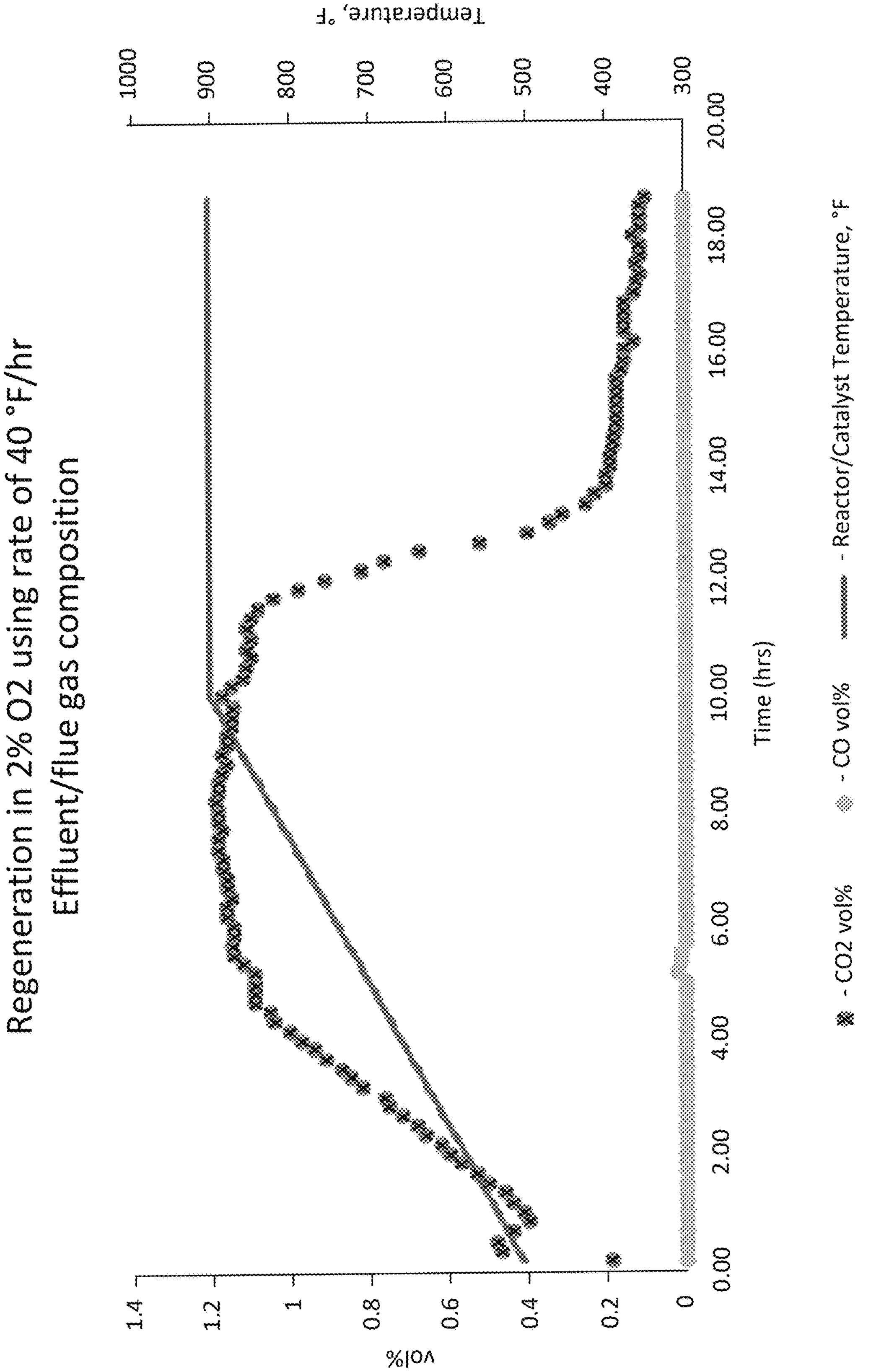

Operation 130 may include, while continuing to flow the oxygen-containing gas over the catalyst, gradually increasing a temperature of the catalyst from the first temperature to a second temperature at a rate selected to continue combusting the deposits and generating the effluent gas that includes carbon dioxide and substantially no carbon monoxide (sub-operation 136). In some examples, the second temperature may be in the range from about 800° F. to about 1500° F. The rate at which the temperature of the catalyst is increased from the first temperature to the second temperature may be in the range of about 10° F. to about 100° F., about 20° F. to about 100° F., or about 30° F. to about 90° F. This rate may be the overall rate over the course of the increase from the first temperature to the second temperature. In some examples, a temperature profile between the first temperature and the second temperature monotonically increase. In addition, in certain examples, the temperature profile may be continuous (e.g., as illustrated in FIG. 5). In other examples, the temperature profile may be stepped (e.g., as illustrated in FIG. 4). By selecting and/or controlling the first temperature, the rate, and/or the temperature profile between the first temperature and the second temperature as discussed herein, the deposits may be substantially combusted while substantially inhibiting the formation of carbon monoxide. For example, carbon monoxide may form less than about 2 mol %, or less than about 0.1 mol %, of the total COx formed while combusting the deposits.

Figure 3:
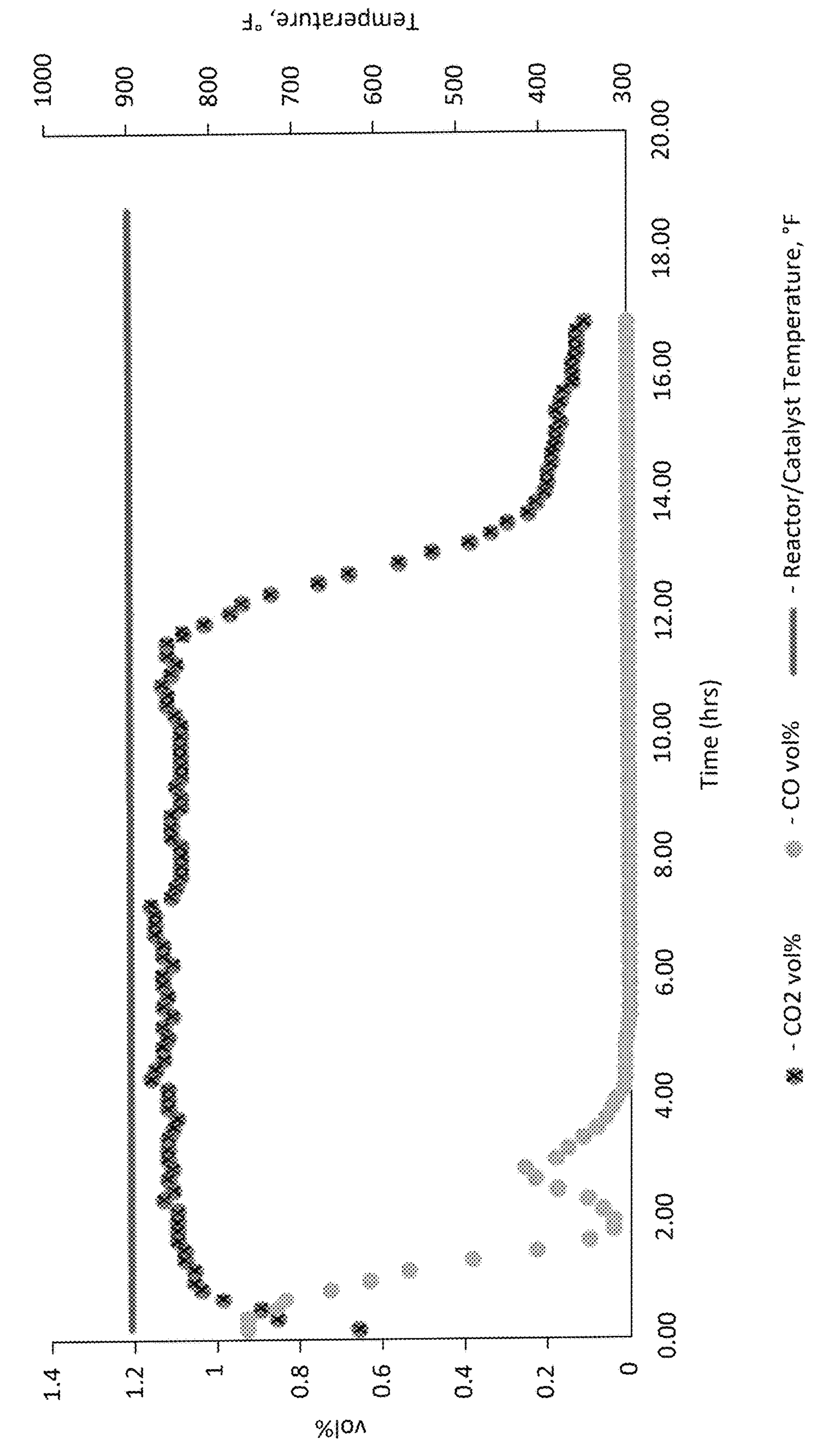
FIG. 3 is a plot illustrating the composition of effluent gas over time that is formed during catalyst regeneration in a comparative example.

For example, referring briefly to FIGS. 3-5, plots illustrating carbon dioxide and carbon monoxide content over time of effluent gas formed during catalyst regeneration, with the righthand scale illustrating temperature of the catalyst, are shown. FIGS. 3-5 illustrate the results of regenerating a catalyst under certain temperature conditions in a testing environment. In each of FIGS. 3-5, a 90 cc catalyst was regenerated using 2% oxygen/nitrogen gas at 1000 Ncc/min (normal cubic centimeters per minute). FIG. 3 illustrates a comparative example and FIGS. 4 and 5 illustrate nonlimiting working examples of the present systems and methods for regenerating a catalyst. As illustrated in FIG. 3, at the beginning of regeneration in a conventional setting, the catalyst/reactor temperature is about 900° F., the carbon dioxide content of the effluent gas is about 0.7 vol %, and the carbon monoxide content of the effluent gas is about 0.9 vol %. In the comparative example illustrated in FIG. 3, carbon monoxide made up 8 mol % of the total COx formed during the regeneration.

In contrast, FIG. 4 illustrates the resulting composition of the effluent gas when a stepped temperature profile was used for the catalyst/reactor temperature between a first temperature of about 450° F. and a second temperature of about 900° F. As illustrated in FIG. 4, the effluent gas contained no carbon monoxide until the catalyst exceeded about 700° F., however, after generating carbon monoxide at this temperature the carbon monoxide content of the effluent gas rapidly decreased back to zero even as the temperature was increased further. Despite the brief peak of about 0.6 vol % of carbon monoxide at approximately time=29 hours, the carbon monoxide made up less than about 2 mol % of the total COx formed during the regeneration illustrated in FIG. 4. In the example of FIG. 4, the total carbon monoxide may be reduced by, e.g., extending the time spent at about 700° F. before stepping up the temperature and/or adding one or more steps between about 700° F. and about 900° F., such as at about 800° F., instead of stepping up from about 700° F. to about 900° F. as in the example of FIG. 4.

FIG. 5 illustrates the resulting composition of effluent gas when a continuous temperature profile was used for the catalyst/reactor temperature between a first catalyst temperature of about 500° F. and a second catalyst temperature of about 900° F., with the temperature increasing at a rate of about 40° F./hr. As illustrated in FIG. 5, the effluent gas contains substantially no carbon monoxide for the duration of the regeneration. The carbon monoxide made up less than about 0.1 mol % of the total COx formed during the regeneration illustrated in FIG. 5.

Referring again to FIG. 1B, regenerating the catalyst during sub-operations 134 and 136 may include an exothermic reaction. Controlling the maximum temperature reached during regeneration may protect the equipment that is used for conversion and/or regeneration, such as the reaction vessel, from thermal damage. In examples, the maximum temperature reached during regeneration, the rate of temperature increase, and/or the temperature profile between the first temperature and the second temperature may be at least partially controlled via the oxygen content of the oxygen-containing gas. That is, in some examples, the oxygen content of the oxygen-containing gas may be changed while combusting the deposits. For example, the oxygen content of the oxygen-containing gas may be increased during while combusting the deposits. The oxygen content of the oxygen-containing gas may be about 0.1-1 vol % at a beginning of combusting the deposits, such as at sub-operation 134. In some examples, the oxygen content of the oxygen-containing gas may be increased to about 2-5 vol % after the beginning of combusting the deposits. For example, the oxygen content of the oxygen-containing gas may be increased to about 2-5 vol % during sub-operation 136. In certain examples, the oxygen content of the oxygen-containing gas may be increased to about 2-5 vol % at or near the end of sub-operation 136. Starting the combustion of the deposits with a lower amount of oxygen and then increasing the amount of oxygen may ensure that the temperature does not increase too quickly (which, e.g., may cause carbon monoxide formation) while also increasing the speed of the regeneration. In examples, the maximum temperature may be reached when all oxygen has been consumed by the combustion of the deposits. Burning deposits such as coke and other organic matter under oxygen deficient conditions generally results in the formation of carbon monoxide. However, as discussed above, the formation of carbon monoxide may be substantially avoided by selecting the first temperature and the rate of temperature increase as disclosed herein.

In some examples, any one or combination of sub-operations 132, 134, and 136 may be performed in the same reactor as operation 120 illustrated in FIG. 1A. For example, converting the renewable feedstock to the mixture including the intermediate composition and heating the catalyst to the first temperature to begin combusting the deposits may be performed in the same reaction vessel. The catalyst may be regenerated at any suitable time. For example, in nonlimiting configurations in which the catalyst is in a fixed bed, the renewable feedstock inlet may be turned off, and the oxygen-containing gas may be provided to the reaction vessel to stimulate the combustion process therein which burns the deposits from the catalyst as described herein.

Referring again to FIG. 1A, optionally method 100 may include further upgrading to convert the intermediate composition to a final product mixture, for example using catalytic treatment conversion (such as hydroprocessing) of the intermediate composition into a product mixture (operation 140). Optionally, method 100 may include separating fuel(s) from the final product mixture (operation 140A). In some examples, the mixture in its entirety, or a portion of the mixture, may be used as a fuel without any further catalytic processing of the mixture. Illustratively, a method for obtaining a fuel from the mixture formed at operation 120 of method 100 illustrated in FIG. 1A may include using distillation to obtain a distillation cut of the mixture. The distillation cut may be used as a fuel or in a fuel blend.

In some examples, the distillation may remove essentially only naphtha from the mixture to form the portion of the mixture that is used as the fuel or in a fuel blend.

Optionally, one or more hydroprocessor(s) may be configured to saturate and hydrodeoxygenate the mixture, or to saturate and deoxygenate the distillation cut. The hydroprocessed mixture or cut may be used as a fuel or in a fuel blend.

Figure 2A:
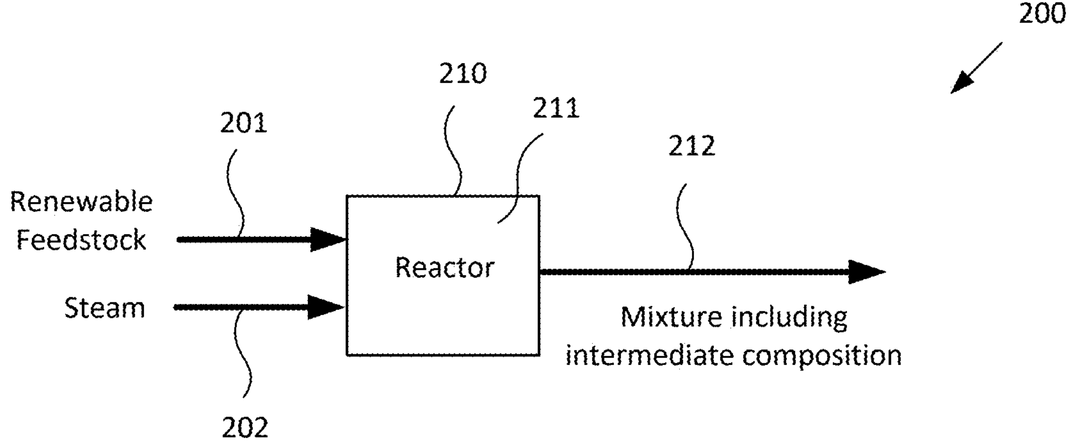
FIG. 2A schematically illustrates an example system for converting a renewable feedstock to a renewable fuel during reaction mode.
Figure 2B:
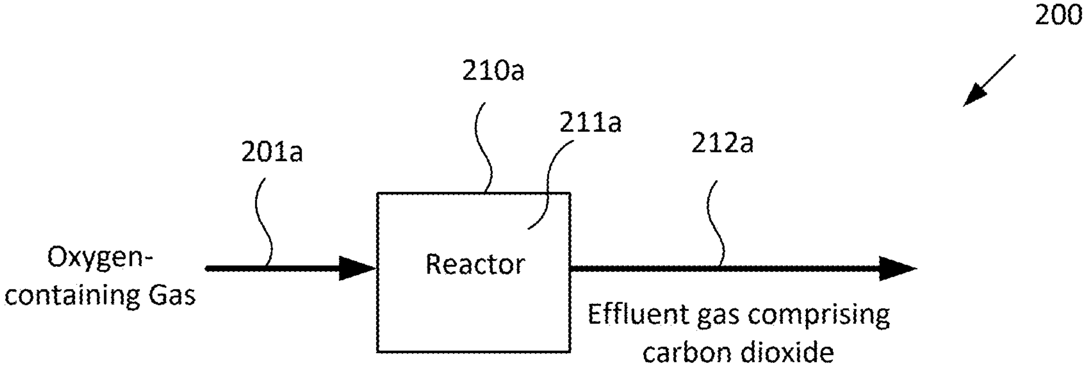
FIG. 2B schematically illustrates an example system for removing deposits from a catalyst during regeneration mode.

FIGS. 2A and 2B schematically illustrate components of a system 200 configured to operate in reaction mode for converting renewable feedstock into a mixture including intermediate composition (FIG. 2A), and regeneration mode wherein deposits are removed from the catalyst (FIG. 2B). In reaction mode (FIG. 2A), renewable feedstock is flowed into reactor 210 via piping 201, optionally along with steam which is flowed into reactor 210 via piping 202. Reactor 210 includes catalyst 211, which may be or may include a metal oxide catalyst on an oxide support as discussed above. When system 200 is in reaction mode (FIG. 2A), the renewable feedstock and optional steam are flowed into the reactor, wherein catalyst 211 catalytically converts the renewable feedstock into a mixture including an intermediate composition, which is flowed out of reactor 210 via piping 212.

The catalytic process to convert the renewable feedstock may cause deposits, such as coke or other organic deposits, to form on the catalyst 211 during the conversion (commonly referred to as "fouling"), causing deactivation of the catalyst and thus requiring regeneration of the catalyst.

FIG. 2B schematically illustrates system 200 operating in regeneration mode, wherein oxygen-containing gas is flowed into reactor 210*a* via piping 201*a* at oxygen-deficient conditions. While flowing the oxygen-containing gas over catalyst 211*a* coated with deposits, catalyst 211*a* is heated to a first temperature to begin combusting the deposits and generating effluent gas that includes carbon dioxide and substantially no carbon monoxide, which is flowed out of reactor 210*a* via piping 212*a*. The temperature of catalyst 211*a* is gradually increased from the first temperature to a second temperature at a rate selected to continue combusting the deposits, while continuing to flow oxygen-containing gas over catalyst 211*a*, generating additional effluent gas that includes carbon dioxide and substantially no carbon monoxide.

The system 200 may additionally include a control system (not shown) that controls the rate and/or ratio at which the feedstock and steam is flowed into the reactor while in reaction mode (FIG. 2A). The control system may receive signals from one or more sensors that detect parameters such as flow rate (of the input feedstock and steam, or output mixture including intermediate composition) or catalyst temperature, and may change one or more operating parameters responsive to such signal(s). For example, a sensor may detect a temperature that is above a specified threshold, and relay the signal to the control system. In response, the control system may communicate a change in the flow rate of the feedstock and/or steam in order to bring the temperature within operating limits.

The control system may also control the rate and at which oxygen-containing gas is flowed into reactor and/or the temperature of the oxygen-containing gas while in regeneration mode (FIG. 2B). The control system may also control the temperature of the catalyst and/or the temperature ramp rate while it is being heated to combust the deposits. The control system may also control the rate at which the catalyst is heated from the first temperature to the second temperature. The control system may also receive signals from sensors located at inlets and/or outlets of the reactor and communicate a change in the flow rate/temperature of oxygen-containing gas and/or temperature/temperature ramp rate of the catalyst in order to maintain the temperature within operating limits and to optimize combustion of the deposits.

In some examples, the control system may control (or cause one or more actuator(s) to control) the input of any one or combination of the renewable feedstock or the steam into the reaction vessel 210 while in reaction mode. In some examples, the control system and/or the actuator(s) may include valve(s) and/or may be directly or indirectly coupled to piping 201 and/or 202 shown in FIG. 2A to start, stop, or adjust the flow rate of the renewable feedstock and/or the steam into the reactor 210 while in reaction mode.

The control system for regeneration mode (which may be the same or different from the control system for reaction mode) may control the input of the oxygen-containing gas into reaction vessel 210*a* while in regeneration mode. In some examples, the control system may include valve(s) and/or may be directly or indirectly coupled to piping 201*a* to start, stop, or adjust the flow rate of the oxygen-containing gas into reaction vessel 210*a* while in regeneration mode.

In addition or alternatively, in certain examples, the control system may control (or cause at least one of the actuator(s) to control) a composition of the oxygen-containing gas. For example, the control system may control the oxygen content of the oxygen-containing gas to be about 0.1-5 vol % in an inert gas. In some examples, the control system and/or the at least one of the actuator(s) may be or may include one or more mass flow controller(s) that are directly or indirectly coupled to the piping. As discussed above, in some examples, the temperature of the catalyst while combusting the deposits may be controlled by controlling the oxygen content of the oxygen-containing gas. In some examples, the system may include one or more temperature sensors (e.g., that may be coupled to the reaction vessel) and the control system may control the oxygen content of the oxygen-containing gas based on temperature data that is received by the control system from the one or more temperature sensors. For example, the control system may utilize an algorithm, a lookup table, or the like to determine what the oxygen content of the oxygen-containing gas should be at a given time based on the received temperature data. Accordingly, the control system may monitor and control the rate at which the catalyst increases in temperature (e.g., from the first temperature to the second temperature) based on the temperature data.

In addition or alternatively, in certain examples, the control system may control/cause a heater (not shown) to heat the catalyst in the reaction vessel. The heater may be integrated with the reaction vessel or separate from the reaction vessel. In examples, the heater may include any one or combination of electric heater(s), gas-fired heater(s), steam heating, heat carrier circulation, microwave heating, plasma heating, or the like. The heater may, e.g., heat the catalyst prior to the removal of the deposits begins and/or during the removal of the deposits. In one nonlimiting example, the heater may heat the catalyst to the first temperature such that the removal of the deposits from the catalyst begins, with the combustion heating the catalyst to the second temperature. As discussed above, in some examples, the heat from the combustion may be controlled by controlling the oxygen content of the oxygen-containing gas. In some examples, the heater may heat the catalyst to the first temperature and the second temperature. Alternatively, in some examples, the catalyst may be heated to the first temperature and the second temperature using the oxygen-containing gas and heat from combustion.

In some examples, the control system may be implemented using a singular controller or using a plurality of controller(s) distributed across one or more components of the system 200. The control system may include a processor and memory, for example. The processor may include one or more general processing unit(s)/central processing unit(s) (CPUs), graphics processing unit(s) (GPUs), microprocessors, or any other suitable processing system. The processor may include a single core processor or multicore processors. The memory may be made up of one or more modules of one or more different types of memory (e.g., flash, RAM, etc.) that may be used to store data related to algorithms, heating rates, oxygen ratios, flow rates, statistical model parameters, temperature thresholds, time thresholds, instructions and variables for the processor, as well as any other suitable information. The control system may be implemented using, e.g., a processor and memory circuitry, hardware, software, or a combination thereof. By way of further example, one or more processors, controllers, ASICs, PLAs, PALs, CPLDs, FPGAs, logical components, software routines or other mechanisms might be implemented to make up the control system. In some examples, the control system may include a wireless transceiver for wireless communication and/or a wired I/O interface for wired communication with components of the system 200 and/or components external to the system 200.

The functions of the above-described control system may be implemented using any suitable computing component(s) configured to implement various features and/or functionality of implementations of the systems and methods disclosed herein. With regard to the above-described implementations set forth herein in the context of systems and methods described with reference to FIGS. 1A-1B, 2A-2B, and 3-5, it will be appreciated that additional variations and details regarding the functionality of these implementations may be carried out by such computing component. It will also be appreciated upon studying the present disclosure that features and aspects of the various systems described herein may be implemented with respect to various methods described herein without departing from the spirit of the disclosure.

As used herein, the terms "circuitry" and "component" may describe a given unit of functionality that may be performed in accordance with one or more implementations of the present application. As used herein, a component may be implemented utilizing any form of hardware, software, or a combination thereof. For example, one or more processors, controllers, ASICs, PLAs, PALs, CPLDs, FPGAs, logical components, software routines, or other mechanisms may be implemented to make up a component. The various components described herein may be implemented as discrete components or the described functions and features may be shared in part or in total among one or more components. In other words, as would be apparent to one of ordinary skill in the art after reading this description, the various features and functionality described herein may be implemented in any given application and may be implemented in one or more separate or shared components in various combinations and permutations. Although various features or functional elements may be individually described or claimed as separate components, it will be appreciated that upon studying the present disclosure that these features and functional elements may be shared among one or more common software and hardware elements. Such a description shall not require or imply that separate hardware or software components are used to implement such features or functionality.

Where components of the application are implemented in whole or in part using software, in implementations, these software elements may be implemented to operate with one or more computing or processing components capable of carrying out the functionality described with respect thereto. After reading this description, it will be appreciated how to implement example configurations described herein using any suitable computing components or architectures.

In some examples, the computing component may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which the computing component is specifically purposed.

The computing component may include, for example, one or more processors, physical computer processors, controllers, control components, or other processing devices, such as a processor, and such as may be included in circuitry. The processor may be implemented using a special-purpose processing engine such as, for example, a microprocessor, controller, or other control logic. In some examples, the processor is connected to a bus by way of circuitry, although any communication medium may be used to facilitate interaction with other components of the computing component or to communicate externally.

The computing component may also include one or more memory components, simply referred to herein as memory. For example, random access memory (RAM) or other dynamic memory may be used for storing information and instructions to be executed by the processor or circuitry. Memory may also be used for storing temporary variables or other intermediate information during execution of instructions to be executed by the processor or circuitry. The computing component may likewise include a read only memory (ROM) or other static storage device coupled to the bus for storing static information and instructions for the processor or circuitry.

The computing component may also include one or more various forms of information storage devices, which may include, for example, a media drive and a storage unit interface. The media drive may include a drive or other mechanism to support fixed or removable storage media. For example, a hard disk drive (HDD), a solid-state drive (SSD), a floppy disk drive, a magnetic tape drive, an optical disk drive, a compact disc (CD) or digital video disc (DVD) drive (R or RW), or other removable or fixed media drive may be provided. Accordingly, removable storage media may include, for example, a hard disk, a floppy disk, magnetic tape, cartridge, optical disk, a CD or DVD, or other fixed or removable medium that is read by, written to, or accessed by the media drive. As these examples illustrate, removable storage media may include a computer usable storage medium having stored therein computer software or data.

Alternatively or additionally, information storage devices may include other similar instrumentalities for allowing computer programs or other instructions or data to be loaded into the computing component. Such instrumentalities may include, for example, a fixed or removable storage unit and a storage unit interface. Examples of such removable storage units and storage unit interfaces may include a program cartridge and cartridge interface, a removable memory (for example, a flash memory or other removable memory component) and memory slot, a PCMCIA slot and card, and other fixed or removable storage units and storage unit interfaces that allow software and data to be transferred from the removable storage unit to the computing component.

Computing component may also include a communications interface. The communications interface may be used to allow software and data to be transferred between the computing component and external devices. Examples of a communications interface may include a modem or softmodem, a network interface (such as Ethernet, network interface card, IEEE 802.XX, or other interface), a communications port (such as for example, a USB port, IR port, RS232 port Bluetooth® interface, or other port), or other communications interface. Software and data transferred via the communications interface may be carried on signals, which may be electronic, electromagnetic (which includes optical) or other signals capable of being exchanged by a given communications interface. These signals may be provided to/from the communications interface via a channel. The channel may carry signals and may be implemented using a wired or wireless communication medium. Some non-limiting examples of a channel may include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, memory, a storage unit interface, removable storage media, and a channel. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component or one or more processors to perform features or functions of the present application as discussed herein.

ADDITIONAL COMMENTS

While various illustrative embodiments of the invention are described above, it will be apparent to one skilled in the art that various changes and modifications can be made therein without departing from the invention. The appended claims are intended to cover all such changes and modifications that fall within the true spirit and scope of the invention.

What is claimed is:

1. A method of removing deposits from a catalyst, the method comprising:

flowing, over a catalyst coated with deposits, oxygen-containing gas at oxygen deficient conditions;

while flowing the oxygen-containing gas at oxygen deficient conditions over the catalyst, heating the catalyst to a first temperature to begin combusting the deposits and generating effluent gas comprising carbon dioxide and substantially no carbon monoxide; and while continuing to flow the oxygen-containing gas over the catalyst, gradually increasing a temperature of the catalyst from the first temperature to a second temperature at a rate selected to continue combusting the deposits and generating effluent gas comprising carbon dioxide and substantially no carbon monoxide, wherein the deposits comprise organic byproducts of converting a renewable feedstock to an intermediate composition.

2. The method of claim 1, wherein the catalyst comprises a metal oxide on an oxide support.

3. The method of claim 1, wherein the first temperature is approximately an ignition temperature of the deposits.

4. The method of claim 1, wherein:

the deposits comprise at least one organic deposit and coke; and the first temperature is selected based on an ignition temperature of the at least one organic deposit, the ignition temperature of the at least one organic deposit being lower than an ignition temperature of the coke.

5. The method of claim 1, wherein the first temperature is about 450-650° F. and the second temperature is about 800-1500° F.

6. The method of claim 1, wherein a temperature profile between the first temperature and the second temperature monotonically increases.

7. The method of claim 1, wherein a temperature profile between the first temperature and the second temperature is continuous.

8. The method of claim 1, wherein a temperature profile between the first temperature and the second temperature is stepped.

9. The method of claim 1, wherein the rate is about 10-100° F./hr.

10. The method of claim 1, further comprising using the catalyst to convert the renewable feedstock to the intermediate composition before heating the catalyst to the first temperature to begin combusting the deposits.

11. The method of claim 10, wherein converting the renewable feedstock to the intermediate composition and heating the catalyst to the first temperature to begin combusting the deposits are performed in the same reaction vessel.

12. The method of claim 11, wherein the reaction vessel is a fixed-bed reactor.

13. The method of claim 1, wherein the oxygen-containing gas comprises about 0.1-5 vol % oxygen in an inert gas.

14. The method of claim 1, wherein an oxygen content of the oxygen-containing gas is increased while combusting the deposits.

15. The method of claim 14, wherein the oxygen content of the oxygen-containing gas is about 0.1-1 vol % at a beginning of combusting the deposits, and is increased to about 2-5 vol % after the beginning of combusting the deposits.

16. The method of claim 1, wherein carbon monoxide forms less than about 2 mol % of the total $CO_x$ formed while combusting the deposits.

17. A system for removing deposits from a catalyst, the system comprising:

a reaction vessel containing a catalyst coated with deposits;

an inlet to flow an oxygen-containing gas over the catalyst in the reaction vessel;

one or more processors; and memory storing machine-readable instructions that, when executed by the one or more processors, cause the system to:

while the oxygen-containing gas flows over the catalyst, heat the catalyst to a first temperature to begin combusting the deposits and generating effluent gas comprising carbon dioxide and substantially no carbon monoxide; and while the oxygen-containing gas continues to flow over the catalyst, gradually increase a temperature of the catalyst from the first temperature to a second temperature at a rate selected to continue combusting the deposits and generating effluent gas comprising carbon dioxide and substantially no carbon monoxide.

18. The system of claim 17, further comprising a heater configured to heat the catalyst to the first temperature and the second temperature.

19. The system of claim 17, wherein gradually increasing the temperature of the catalyst from the first temperature to the second temperature at the rate comprises adjusting an oxygen content of the oxygen-containing gas.

* * * * *